(12) United States Patent
Gu

(10) Patent No.: US 11,880,629 B2
(45) Date of Patent: Jan. 23, 2024

(54) DISPLAY CONTROL METHOD AND APPARATUS

(71) Applicant: Huawei Technologies Co., Ltd., Shenzhen (CN)

(72) Inventor: Hejin Gu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 122 days.

(21) Appl. No.: 17/625,550

(22) PCT Filed: Jul. 8, 2020

(86) PCT No.: PCT/CN2020/100908
§ 371 (c)(1),
(2) Date: Jan. 7, 2022

(87) PCT Pub. No.: WO2021/004489
PCT Pub. Date: Jan. 14, 2021

(65) Prior Publication Data
US 2022/0291892 A1    Sep. 15, 2022

(30) Foreign Application Priority Data
Jul. 8, 2019   (CN) .......................... 201910611276.6

(51) Int. Cl.
*G06F 3/14* (2006.01)
*G09G 3/00* (2006.01)
(Continued)

(52) U.S. Cl.
CPC ........... *G06F 3/1454* (2013.01); *G09G 3/001* (2013.01); *G09G 5/003* (2013.01); *G09G 5/02* (2013.01);
(Continued)

(58) Field of Classification Search
CPC ...... G06F 3/1454; G09G 3/001; G09G 5/003; G09G 5/12; G09G 2340/145; G09G 2354/00
See application file for complete search history.

(56) References Cited

U.S. PATENT DOCUMENTS

2005/0251748 A1   11/2005   Gusmorino et al.
2015/0020013 A1   1/2015   Kim et al.
(Continued)

FOREIGN PATENT DOCUMENTS

CN   105516754 A   4/2016
CN   105786420 A   7/2016
(Continued)

*Primary Examiner* — Abbas I Abdulselam
(74) *Attorney, Agent, or Firm* — Conley Rose, P.C.

(57) ABSTRACT

A display control method and an apparatus applied to a first device that supports projection. When the first device determines that the first device is in a state of performing projection onto a second device, the first device receives a first instruction to run a first application in a foreground, and when the first device determines that the first device is in the display state of performing projection onto the second device, the first device determines, based on the first instruction, a second application that is running in the background on the first device and that has same attribute information as the first application, and simultaneously projects a running interface of the first application and a running interface of the second application onto a display interface of the second device.

20 Claims, 9 Drawing Sheets

(51) Int. Cl.
   *G09G 5/00*       (2006.01)
   *G09G 5/02*       (2006.01)
(52) U.S. Cl.
   CPC ... *G09G 2340/145* (2013.01); *G09G 2354/00* (2013.01)

(56) References Cited

U.S. PATENT DOCUMENTS

| | | |
|---|---|---|
| 2015/0304467 A1 | 10/2015 | Seo |
| 2018/0152663 A1 | 5/2018 | Wozniak et al. |

FOREIGN PATENT DOCUMENTS

| | | |
|---|---|---|
| CN | 205584412 U | 9/2016 |
| CN | 106454532 A | 2/2017 |
| CN | 106959796 A | 7/2017 |
| CN | 107145348 A | 9/2017 |
| CN | 107908386 A | 4/2018 |
| CN | 108279953 A | 7/2018 |
| CN | 108958684 A | 12/2018 |
| CN | 109508162 A | 3/2019 |
| CN | 109889885 A | 6/2019 |
| CN | 109947384 A | 6/2019 |
| CN | 110515576 A | 11/2019 |
| EP | 2658228 A1 | 10/2013 |
| JP | 2011215509 A | 10/2011 |
| JP | 2012194991 A | 10/2012 |

DISPLAY CONTROL METHOD AND APPARATUS

CROSS-REFERENCE TO RELATED APPLICATIONS

This is a U.S. National Stage of International Patent Application No. PCT/CN2020/100908 filed on Jul. 8, 2020, which claims priority to Chinese Patent Application No. 201910611276.6 filed on Jul. 8, 2019. Both of the aforementioned applications are hereby incorporated by reference in their entireties.

TECHNICAL FIELD

This application relates to electronic technologies, and in particular, to a display control method and an apparatus.

BACKGROUND

With continuous development of electronic technologies and terminal technologies, a conventional electronic device such as a mobile phone cannot meet a display requirement of a user due to a relatively small display of the electronic device. Therefore, in a projection technology of the electronic device, the mobile phone may project a display interface of the mobile phone onto an electronic device with a larger display. For example, the mobile phone projects a display interface onto a computer for displaying in a display interface of the computer. The projection technology enables the mobile phone to project more content onto the display interface of the computer for display.

In the conventional technology, after the mobile phone and the computer establish a projection connection relationship, the mobile phone may project an icon of an application in the display interface of the mobile phone onto the computer for displaying in the display interface of the computer. In this case, a user may operate a mouse of the computer to click the icon displayed in the display interface of the computer, to open the corresponding application on the mobile phone. After running the corresponding application according to the operation of the user, the mobile phone continues to project a running interface of the application onto the computer for displaying in the display interface of the computer.

However, in the existing projection technology, the mobile phone projects a running interface of only one application clicked by the user onto the computer at a time, and the computer displays the application in the display interface of the computer. As a result, control efficiency during control to display of the application is relatively low, and user experience during projection is poor.

SUMMARY

This application provides a display control method and an apparatus, applied to a first device that supports projection. When the first device determines that the first device is in a state of performing projection onto a second device, after the first device receives a first instruction to run a first application in the foreground, when the first device determines that the first device is in the display state of performing projection onto the second device, the first device determines, based on the first instruction, at least one second application that is run in the background on the first device and that has same attribute information as the first application, and simultaneously projects a running interface of the first application and a running interface of the at least one determined second application onto the second device for displaying in a display interface of the second device, to improve display control efficiency of an application and improve user experience when a user uses the first device to perform projection display on the second device.

According to a first aspect of this application, a display control method is provided, including:

A first device receives a first instruction, where the first instruction is used to instruct the first device to run a first application in the foreground;

when determining that the first device is in a display state of performing projection onto a second device, the first device determines at least one second application on the first device based on the first instruction, where attribute information of the second application is the same as that of the first application, and the second application is in a background running state;

the first device projects a running interface of the first application and a running interface of the at least one determined second application onto the second device; and the second device displays the running interface of the first application and the running interface of the at least one determined second application in a display interface.

In conclusion, in the display control method provided in this embodiment, when the first device that supports projection performs projection onto the second device for display, after the first device receives the instruction to run the first application in the foreground, the first device determines the at least one second application that is run in the background on the first device and that has the same attribute information as the first application. Therefore, the first device can automatically project running interfaces of more applications with same attribute information onto the second device based on a viewing requirement of a user for an application, so that the second device can simultaneously display, in the display interface, the running interface of the first application and the running interface of the at least one second application that has the same attribute information as the first application, to more intelligently meet a requirement of the user for simultaneously viewing applications with same attribute information.

In an embodiment of the first aspect of this application, that the first device projects the running interface of the first application and the running interface of the at least one determined second application onto the display interface of the second device for display includes:

The first device projects the running interface of the first application and a first control onto the display interface of the second device for display;

the second device receives a first target operation performed by the user on the first control;

the second device sends a second instruction to the first device based on the first target operation;

the first device receives the second instruction;

the first device projects the running interface of the first application and the running interface of the at least one determined second application onto the second device based on the second instruction; and the second device displays the running interface of the first application and the running interface of the at least one determined second application in the display interface.

In conclusion, in the display control method provided in this embodiment, the first device simultaneously projects the running interface of the first application and the running interfaces of all the second applications onto the second device for displaying in the display interface of the second device only after the second device detects the first target operation on the first control. In this embodiment, requirements in different application scenarios can be met. The first device displays the running interfaces of the at least one second application in tile mode based on the second instruction only after the user clicks the first control and the second device sends the second instruction to the first device after the second device detects the first target operation on the first control. Therefore, more functions can be provided by the display control method, display control efficiency of an application is further improved, and user experience when the user uses the first device and the second device to perform projection display is improved.

In an embodiment of the first aspect of this application, that the first device projects the running interface of the first application and a first control onto the display interface of the second device for display includes:

The first device projects the running interface of the first application, the first control, and the stacked running interface of the at least one second application onto the second device; and the second device displays the running interface of the first application, the first control, and the stacked running interface of the at least one second application in the display interface.

That the first device projects the running interface of the first application and a running interface of the at least one determined second application onto the second device based on the second instruction includes:

The first device projects the tile running interface of the at least one second application and the running interface of the first application onto the second device based on the second instruction.

In conclusion, in the display control method provided in this embodiment, when the first device performs projection onto the second device for display, after the first device receives the instruction to run the first application in the foreground, the first device determines the at least one second application that is run in the background on the first device and that has the same attribute information as that first application, does not directly project the running interfaces of all the applications onto the second device for display, but directly displays only the running interface of the first application corresponding to the instruction, and stacks the second application for display, to prompt the user that an application of a same type is stacked in the background. The first device simultaneously projects the running interface of the first application and the running interfaces of all the second applications onto the display interface of the second device for display only after the second device detects the first target operation on the first control.

In an embodiment of the first aspect of this application, that the first device projects the running interface of the first application and the running interface of the at least one determined second application onto the display interface of the second device for display based on the second instruction includes:

The first device projects the running interface of the first application, the running interface of the at least one determined second application, and a second control onto the second device based on the second instruction; and the second device displays the running interface of the first application, the running interface of the at least one determined second application, and the second control in the display interface.

After the first device projects the running interface of the first application and the running interface of the at least one determined second application onto the second device based on the second instruction, the method further includes:

the second device receives a second target operation performed by the user on the second control;

the second device sends a third instruction to the first device based on the second target operation;

the first device receives the third instruction;

the first device projects the running interface of the first application, the first control, and the stacked running interface of the at least one second application onto the second device based on the third instruction; and the second device displays the running interface of the first application, the first control, and the stacked running interface of the at least one second application in the display interface.

In conclusion, in the display control method provided in this embodiment, after projecting the running interface of the first application and the running interface of the at least one second application onto the display interface, the first device further projects the second control onto the display interface. After the second device detects the third target operation on the second control, the first device projects the stacked running interface of the at least one second application onto the second device for display. Therefore, more flexible display control is implemented, and user experience of the electronic device is further improved.

In an embodiment of the first aspect of this application, before the first device receives the first instruction, the method further includes:

The first device projects a third control corresponding to the first application onto the second device;

the second device displays the third control in the display interface;

the second device receives a third target operation performed by the user on the third control; and the second device sends the first instruction to the first device based on the third target operation.

In an embodiment of the first aspect of this application, the attribute information includes a type of an application, a keyword in an application name, or tag information of an application.

In an embodiment of the first aspect of this application, when the first device projects the running interface of the at least one second application that is run in the background onto the second device, a running interface of each second application is the same as a running interface displayed before the second application is switched to the background running state.

In conclusion, in the display control method provided in this embodiment, when projecting the running interface of the at least one determined second application onto the second device for display, the first device specifically switches an interface of the second application in the background running state to an interface displayed before the second application enters the background running state for projection. In this way, during display control of an application, real-time display of the second application can be implemented. In an application scenario such as a price comparison scenario, more flexible display control of an application is implemented to further improve user experience.

According to a second aspect of this application, a projection system is provided, including:

a first device and a second device, where the first device has a projection capability, and supports projection onto the second device.

The first device is configured to:

receive a first instruction, where the first instruction is used to instruct the first device to run a first application in the foreground;

when determining that the first device is in a display state of performing projection onto the second device, determine at least one second application on the first device based on the first instruction, where attribute information of the second application is the same as that of the first application, and the second application is in a background running state; and project a running interface of the first application and a running interface of the at least one determined second application onto the second device.

The second device is configured to display the running interface of the first application and the running interface of the at least one determined second application in a display interface.

In an embodiment of the second aspect of this application, the first device is specifically configured to project the running interface of the first application and a first control onto the display interface of the second device for display;

the second device is configured to receive a first target operation performed by a user on the first control, and send a second instruction to the first device based on the first target operation;

the first device is specifically configured to receive the second instruction, and project the running interface of the first application and the running interface of the at least one determined second application onto the second device based on the second instruction; and the second device is specifically configured to display the running interface of the first application and the running interface of the at least one determined second application in the display interface.

In an embodiment of the second aspect of this application, the first device is specifically configured to:

project the running interface of the first application, the first control, and the stacked running interface of the at least one second application onto the second device; and the second device is specifically configured to display the running interface of the first application, the first control, and the stacked running interface of the at least one second application in the display interface.

In an embodiment of the second aspect of this application, the first device is specifically configured to:

project the tile running interface of the at least one second application and the running interface of the first application onto the second device based on the second instruction; and the second device displays the running interface of the first application and the running interface of the at least one second application in the display interface in tile mode side by side.

In an embodiment of the second aspect of this application, the first device is specifically configured to project the running interface of the first application, the running interface of the at least one determined second application, and a second control onto the second device based on the second instruction;

the second device is further configured to display the running interface of the first application, the running interface of the at least one determined second application, and the second control in the display interface;

the second device is further configured to receive a second target operation performed by the user on the second control, and send a third instruction to the first device based on the second target operation;

the first device is specifically configured to receive the third instruction, and project the running interface of the first application, the first control, and the stacked running interface of the at least one second application onto the second device based on the third instruction; and the second device is specifically configured to display the running interface of the first application, the first control, and the stacked running interface of the at least one second application in the display interface.

In an embodiment of the second aspect of this application, the first device is further configured to project a third control corresponding to the first application onto the second device;

the second device is further configured to display the third control in the display interface; and the second device is further configured to receive a third target operation performed by the user on the third control, and send the first instruction to the first device based on the third target operation.

In an embodiment of the second aspect of this application, the attribute information includes a type of an application, a keyword in an application name, or tag information of an application.

In an embodiment of the second aspect of this application, when the first device projects the running interface of the at least one second application that is run in the background onto the second device, a running interface of each second application is the same as a running interface displayed before the second application is switched to the background running state.

According to a third aspect of this application, a display control method is provided, and is applied to a first device that supports projection. The method includes: When the first device determines that the first device is in a state of performing projection onto a second device, the first device receives a first instruction, where the first instruction is used to instruct the first device to run a first application in the foreground;

when determining that the first device is in the display state of performing projection onto the second device, the first device determines at least one second application on the first device based on the first instruction, where attribute information of the second application is the same as that of the first application, and the second application is in a background running state; and the first device projects a running interface of the first application and a running interface of the at least one determined second application onto the second device, so that the running interface of the first application and the running interface of the at least one determined second application are simultaneously displayed in a display interface of the second device.

In an embodiment of the third aspect of this application, that the first device projects a running interface of the first application and a running interface of the at least one determined second application onto the second device includes:

The first device projects the running interface of the first application and a first control onto the second device, so that the running interface of the first application and the first control are simultaneously displayed in the display interface of the second device;

the first device receives a second instruction, where the second instruction is generated in response to a first target operation performed by a user on the first control; and the first device projects the running interface of the first application and the running interface of the at least one determined second application onto the second device based on the second instruction, so that the running interface of the first application and the running interface of the at least one determined second application are simultaneously displayed in the display interface of the second device.

In an embodiment of the third aspect of this application, that the first device projects the running interface of the first application and a first control onto the display interface of the second device, so that the running interface of the first application and the first control are simultaneously displayed in the display interface of the second device includes:

The first device projects the running interface of the first application, the first control, and the stacked running interface of the at least one second application onto the second device, so that the running interface of the first application, the first control, and the stacked running interface of the at least one second application are simultaneously displayed in the display interface of the second device.

In an embodiment of the third aspect of this application, the second instruction is generated by the second device in response to the first target operation performed by the user on the first control; or the second instruction is generated by the first device in response to the first target operation performed by the user on the first control.

In an embodiment of the third aspect of this application, that the first device projects the running interface of the first application and the running interface of the at least one determined second application onto the second device based on the second instruction, so that the running interface of the first application and the running interface of the at least one determined second application are simultaneously displayed in the display interface of the second device includes:

The first device projects the tile running interface of the at least one second application and the running interface of the first application onto the second device based on the second instruction, so that the running interface of the first application and the running interface of the at least one second application are displayed in the display interface of the second device in tile mode side by side.

In an embodiment of the third aspect of this application, that the first device projects the running interface of the first application and the running interface of the at least one determined second application onto the second device based on the second instruction, so that the running interface of the first application and the running interface of the at least one determined second application are simultaneously displayed in the display interface of the second device includes:

The first device projects the running interface of the first application, the running interface of the at least one determined second application, and a second control onto the second device based on the second instruction, so that the running interface of the first application, the running interface of the at least one determined second application, and the second control are simultaneously displayed in the display interface of the second device; and after the first device projects the running interface of the first application, the running interface of the at least one determined second application, and the second control onto the second device based on the second instruction, so that the running interface of the first application, the running interface of the at least one determined second application, and the second control are simultaneously displayed in the display interface of the second device, the method further includes:

The first device receives a third instruction, where the third instruction is generated in response to a second target operation performed by the user on the second control; and the first device projects the running interface of the first application, the first control, and the stacked running interface of the at least one second application onto the second device based on the third instruction, so that the running interface of the first application, the first control, and the stacked running interface of the at least one second application are simultaneously displayed in the display interface of the second device.

In an embodiment of the third aspect of this application, before the first device receives the first instruction, the method further includes: The first device projects a third control corresponding to the first application onto the second device, so that the third control is displayed in the display interface of the second device.

In an embodiment of the third aspect of this application, the attribute information includes a type of an application, a keyword in an application name, or tag information of an application.

In an embodiment of the third aspect of this application, when the first device projects the running interface of the at least one second application that is run in the background onto the second device, a running interface of each second application is the same as a running interface displayed before the second application is switched to the background running state.

According to a fourth aspect of this application, a display control apparatus is provided, and may be configured to perform the display control method according to the third aspect of this application. The apparatus includes: a receiving module, configured to receive a first instruction, where the first instruction is used to instruct the first device to run a first application in the foreground; a processing module, configured to: when determining that the first device is in a display state of performing projection onto a second device, determine at least one second application on the first device based on the first instruction, where attribute information of the second application is the same as that of the first application, and the second application is in a background running state; and a sending module, configured to project a running interface of the first application and a running interface of the at least one determined second application onto the second device, so that the running interface of the first application and the running interface of the at least one determined second application are simultaneously displayed in a display interface of the second device.

In an embodiment of the fourth aspect of this application, the sending module is specifically configured to project the running interface of the first application and a first control onto the second device, so that the running interface of the first application and the first control are simultaneously displayed in the display interface of the second device. The receiving module is further configured to receive a second instruction, where the second instruction is generated in response to a first target operation performed by a user on the first control. The sending module is specifically configured to project the running interface of the first application and the running interface of the at least one determined second application onto the second device based on the second instruction, so that the running interface of the first application and the running interface of the at least one determined second application are simultaneously displayed in the display interface of the second device.

In an embodiment of the fourth aspect of this application, the sending module is specifically configured to project the running interface of the first application, the first control, and the stacked running interface of the at least one second application onto the second device, so that the running interface of the first application, the first control, and the stacked running interface of the at least one second application are simultaneously displayed in the display interface of the second device.

In an embodiment of the fourth aspect of this application, the second instruction is generated by the second device in response to the first target operation performed by the user on the first control; or the second instruction is generated by the first device in response to the first target operation performed by the user on the first control.

In an embodiment of the fourth aspect of this application, the sending module is specifically configured to project the tile running interface of the at least one second application and the running interface of the first application onto the second device based on the second instruction, so that the running interface of the first application and the running interface of the at least one second application are displayed in the display interface of the second device in tile mode side by side.

In an embodiment of the fourth aspect of this application, the sending module is specifically configured to project the running interface of the first application, the running interface of the at least one determined second application, and a second control onto the second device based on the second instruction, so that the running interface of the first application, the running interface of the at least one determined second application, and the second control are simultaneously displayed in the display interface of the second device. The receiving module is further configured to receive a third instruction, where the third instruction is generated in response to a second target operation performed by the user on the second control. The sending module is further configured to project the running interface of the first application, the first control, and the stacked running interface of the at least one second application onto the second device based on the third instruction, so that the running interface of the first application, the first control, and the stacked running interface of the at least one second application are simultaneously displayed in the display interface of the second device.

In an embodiment of the fourth aspect of this application, the sending module is further configured to project a third control corresponding to the first application onto the second device, so that the third control is displayed in the display interface of the second device.

In an embodiment of the fourth aspect of this application, the attribute information includes a type of an application, a keyword in an application name, or tag information of an application.

In an embodiment of the fourth aspect of this application, when the sending module projects the running interface of the at least one second application that is run in the background onto the second device, a running interface of each second application is the same as a running interface displayed before the second application is switched to the background running state.

According to a fifth aspect of this application, an electronic device with a projection capability is provided, and may be configured to perform the method performed by the first device according to the third aspect of this application. The electronic device includes a receiver, a processor, and a transmitter, where the processor is separately coupled to the transmitter and the receiver.

The receiver is configured to receive a first instruction, where the first instruction is used to instruct the first device to run a first application in the foreground; the processor is configured to: when determining that the first device is in a display state of performing projection onto a second device, determine at least one second application on the first device based on the first instruction, where attribute information of the second application is the same as that of the first application, and the second application is in a background running state; and the transmitter is configured to project a running interface of the first application and a running interface of the at least one determined second application onto the second device, so that the running interface of the first application and the running interface of the at least one determined second application are simultaneously displayed in a display interface of the second device.

In an embodiment of the fifth aspect of this application, the transmitter is specifically configured to project the running interface of the first application and a first control onto the second device, so that the running interface of the first application and the first control are simultaneously displayed in the display interface of the second device. The receiver is further configured to receive a second instruction, where the second instruction is generated in response to a first target operation performed by a user on the first control. The transmitter is specifically configured to project the running interface of the first application and the running interface of the at least one determined second application onto the second device based on the second instruction, so that the running interface of the first application and the running interface of the at least one determined second application are simultaneously displayed in the display interface of the second device.

In an embodiment of the fifth aspect of this application, the transmitter is specifically configured to project the running interface of the first application, the first control, and the stacked running interface of the at least one second application onto the second device, so that the running interface of the first application, the first control, and the stacked running interface of the at least one second application are simultaneously displayed in the display interface of the second device.

In an embodiment of the fifth aspect of this application, the second instruction is generated by the second device in response to the first target operation performed by the user on the first control; or the second instruction is generated by the first device in response to the first target operation performed by the user on the first control.

In an embodiment of the fifth aspect of this application, the transmitter is specifically configured to project the tile running interface of the at least one second application and the running interface of the first application onto the second device based on the second instruction, so that the running interface of the first application and the running interface of the at least one second application are displayed in the display interface of the second device in tile mode side by side.

In an embodiment of the fifth aspect of this application, the transmitter is specifically configured to project the running interface of the first application, the running interface of the at least one determined second application, and a second control onto the second device based on the second instruction, so that the running interface of the first application, the running interface of the at least one determined second application, and the second control are simultaneously displayed in the display interface of the second device. The receiver is further configured to receive a third instruction, where the third instruction is generated in response to a second target operation performed by the user on the second control. The transmitter is further configured to project the running interface of the first application, the first control, and the stacked running interface of the at least one second application onto the second device based on the third instruction, so that the running interface of the first application, the first control, and the stacked running interface of the at least one second application are simultaneously displayed in the display interface of the second device.

In an embodiment of the fifth aspect of this application, the transmitter is further configured to project a third control corresponding to the first application onto the second device, so that the third control is displayed in the display interface of the second device.

In an embodiment of the fifth aspect of this application, the attribute information includes a type of an application, a keyword in an application name, or tag information of an application.

In an embodiment of the fifth aspect of this application, when the transmitter projects the running interface of the at least one second application that is run in the background onto the second device, a running interface of each second application is the same as a running interface displayed before the second application is switched to the background running state.

According to a sixth aspect of this application, an electronic device is provided, and includes a communications interface, one or more processors, one or more memories, a plurality of applications, and one or more programs. The one or more programs are stored in the one or more memories; the communications interface is configured to receive a signal from the outside of the electronic device, and send, based on an indication of the processor, data to another device connected to the electronic device; and when executing the one or more programs, the processor performs the method according to the third aspect of this application.

According to a seventh aspect of this application, a computer-readable storage medium including instructions is provided. When the instructions are run on a computer, the computer is enabled to perform the method according to the third aspect.

According to an eighth aspect of this application, a computer program product including instructions is provided. When the computer program product is run on an electronic device, the electronic device is enabled to perform the method according to the third aspect.

DESCRIPTION OF EMBODIMENTS

Figure 1:
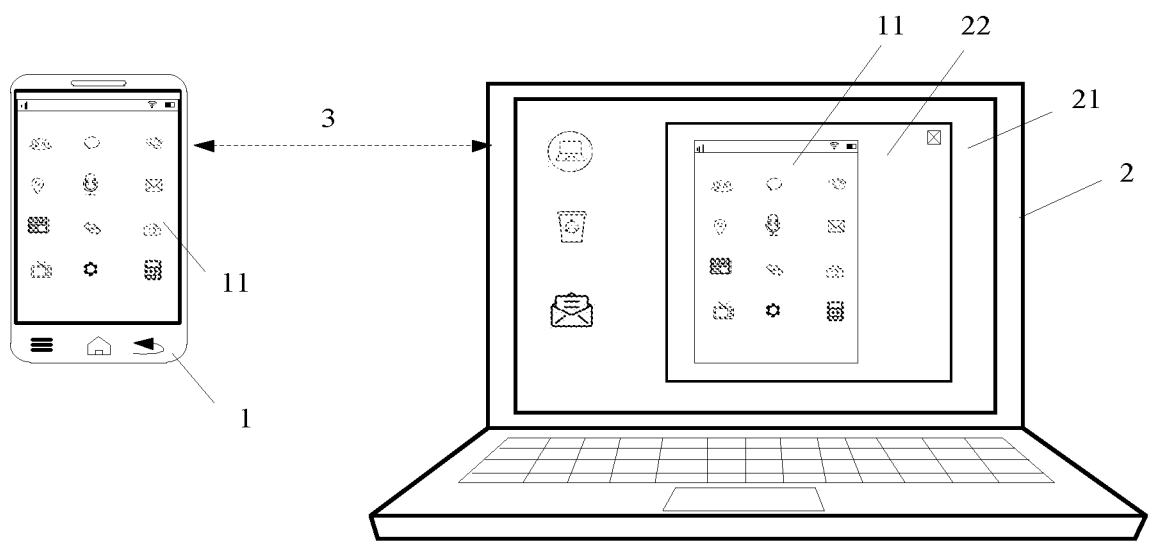
FIG. 1 is a schematic diagram of an application scenario according to this application.

FIG. 1 is a schematic diagram of an application scenario according to this application. As shown in FIG. 1, embodiments of this application may be applied to an application scenario in which a first device 1 performs projection onto a second device 2 for display. In this application, a device providing display content is denoted as the first device 1, and a device that receives and displays the display content provided by the first device 1 is denoted as the second device 2.

Optionally, the first device 1 may be an electronic device such as a mobile phone, a tablet computer, or a laptop computer that can provide display content. In addition, the first device 1 supports a projection function. That is, the first device 1 may project to-be-displayed content onto the second device 2, so that the second device 2 displays the to-be-displayed content projected by the first device 1. Optionally, the second device 2 may be an electronic device such as a tablet computer, a laptop computer, a desktop computer, or a television that has a display interface.

In the scenario shown in FIG. 1, an example in which the first device 1 is a mobile phone and the second device 2 is a laptop computer is used for description. In order that the first device 1 projects the to-be-displayed content onto the second device 2 for displaying in the display interface of the second device 2, first, the first device 1 and the second device 2 need to establish a projection connection relationship 3.

Optionally, the projection connection relationship 3 includes a projection connection relationship based on wireless communication or a projection connection relationship based on wired communication. The projection connection relationship between the first device 1 and the second device 2 is not specifically limited in the embodiments of this application.

For example, in the projection connection relationship based on wireless communication, the first device 1 and the second device 2 may be connected in a near field communication (near field communication, NFC) manner. In some specific applications of the technologies, the first device 1 and the second device 2 may establish an NFC-based projection connection through "Share OneHop". Alternatively, optionally, the first device 1 and the second device 2 may be further connected in a short-range communications manner such as Bluetooth or wireless fidelity (wireless fidelity, Wi-Fi).

For another example, in the projection connection relationship based on wired communication, the first device 1 and the second device 2 may be connected through a video graphics array (video graphics array, VGA), a digital visual interface (digital visual interface, DVI), or a high definition multimedia interface (high definition multimedia interface, HDMI).

In addition, the projection connection between the first device 1 and the second device 2 includes a direct connection between the first device 1 and the second device 2, or includes a connection that is between the first device 1 and the second device 2 and that passes through a relay device (for example, a router). The first device 1 may project the to-be-displayed content onto the second device 2 by using the relay device for displaying in the display interface of the second device 2.

As shown in FIG. 1, after the first device 1 and the second device 2 establish the projection connection relationship 3, the first device 1 may project the to-be-displayed content onto the second device 2 for displaying in the display interface of the second device 2, to implement projection onto the second device for display.

In a specific projection implementation, as shown in FIG. 1, the first device 1 may project a display interface 11 of the first device 1 onto a display interface 21 of the second device 2 for display. In addition, the second device 2 may display, in a window 22 in the display interface 21 of the second device 2, the display interface 11 projected by the first device 1. It can be learned that content displayed in real time in the display interface 11 of the first device 1 can be completely synchronously displayed in the display interface 21 of the second device 2.

Figure 2:
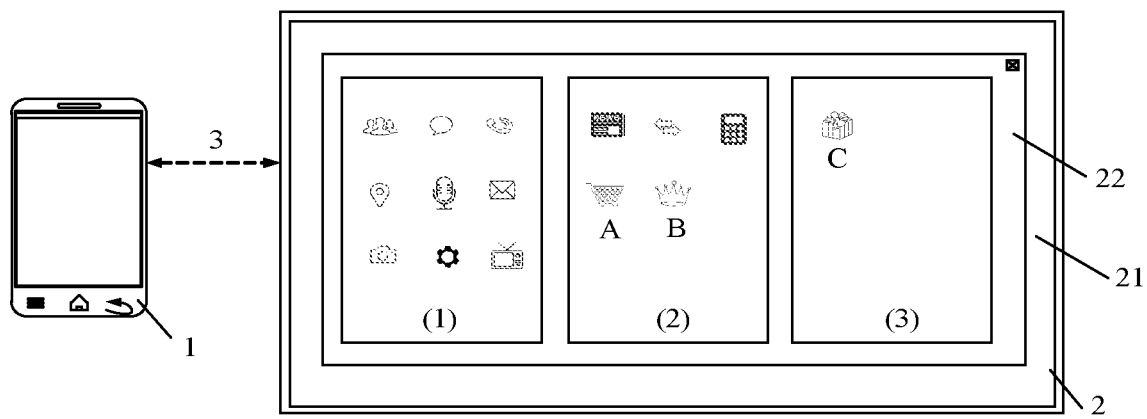
FIG. 2 is a schematic diagram in which a first device projects a home screen onto a second device for display in the conventional technology.

In another specific projection implementation, after the first device 1 and the second device 2 establish the projection connection 3, the first device 1 may enter a screen-off state, and project content that needs to be displayed onto the display interface of the second device for display. For example, FIG. 2 is a schematic diagram in which the first device projects a home screen onto the second device for display in the conventional technology. After the projection connection 3 between the first device 1 and the second device 2 is established, the first device 1 no longer displays the display interface 11 of the first device 1, but switches to the screen-off state. In addition, in the screen-off state, the first device 1 may project content displayed in the display interface 11 onto the second device 2 for displaying in the window 22 in the display interface 21 of the second device 2. In addition, because the display interface 21 of the second device 2 is larger than the display interface 11 of the first device 1, the first device 1 may simultaneously project more sub-interfaces of the home screen of the first device 1 onto the second device 2 for display. For example, in the example shown in FIG. 2, the home screen of the first device 1 includes at least three sub-interfaces (1), (2), and (3), and each sub-interface includes a control corresponding to at least one application. The first device 1 may simultaneously project the sub-interfaces (1), (2), and (3) included in the home screen of the first device 1 onto the second device 2 for displaying in the display interface 21 of the second device 2.

Further, after the first device 1 projects, in the manner shown in FIG. 2, the to-be-displayed content onto the second device 2 for displaying in the display interface 21 of the second device 2, if the second device 2 detects a click operation performed by a user on a control corresponding to any application in the display interface 21, the second device 2 may send an instruction of the corresponding application to the first device 1 through the projection connection relationship, so that the first device 1 determines and runs the application based on the instruction, and then projects a running interface of the application onto the second device 2 for displaying in the display interface 21 of the second device 2.

Figure 3:
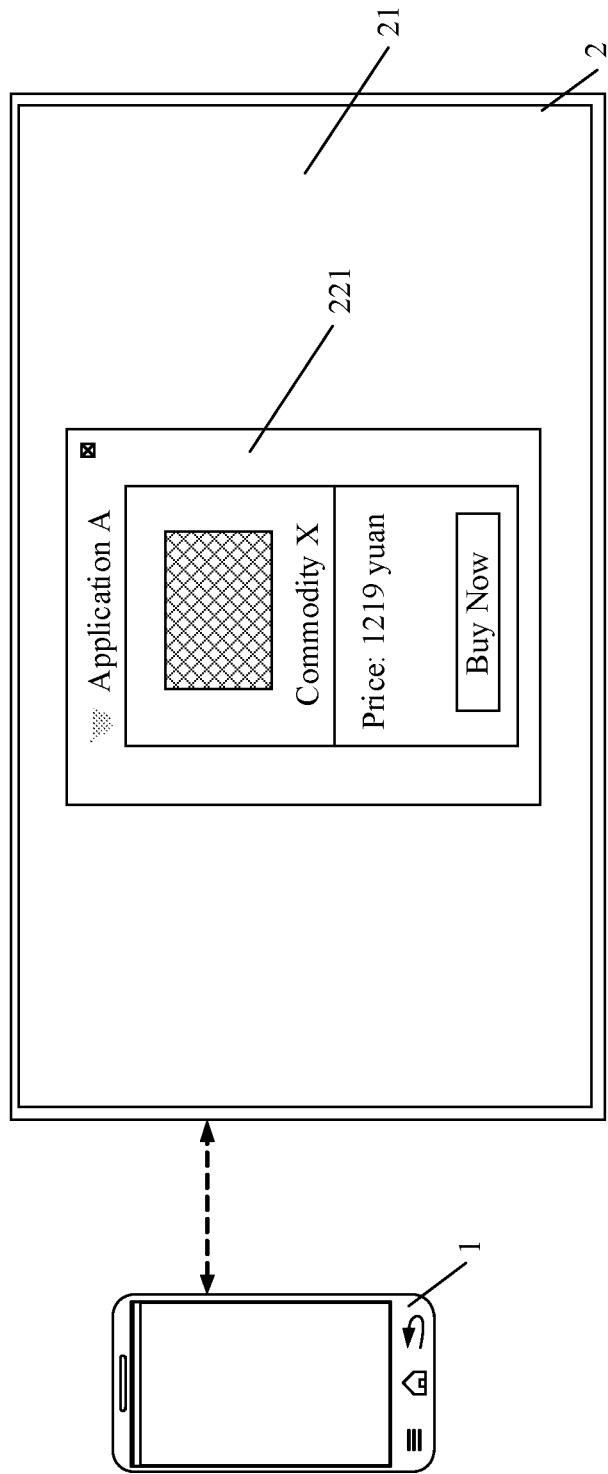
FIG. 3 is a schematic diagram in which a first device projects a running interface of an application onto a second device for display in the conventional technology.

For example, in the example shown in FIG. 2, when the first device 1 projects the home screen of the first device 1 onto the second device 2 for displaying in the display interface 21 of the second device 2, the sub-interface (2) includes an icon of a shopping application A and an icon of a shopping application B, and the sub-interface (3) includes an icon of a shopping application C. After the second device 2 detects a click operation performed by the user on the icon of the shopping application A, the second device 2 sends an instruction to the first device through the connection relationship 3, to indicate the first device 1 that the icon of the shopping application A is clicked and the shopping application A needs to be run in the foreground. After receiving the instruction, the first device 1 runs the shopping application A in the foreground based on the instruction, and projects a running interface of the shopping application A onto the second device 2 for displaying in the display interface 21 of the second device 2. For example, FIG. 3 is a schematic diagram in which the first device projects a running interface of an application onto the second device for display in the conventional technology. After running the shopping application A in the foreground, the first device 1 may project the running interface of the shopping application A onto the second device 2 for displaying in a window 221 in the display interface 21 of the second device 2. Optionally, if the shopping application A is in a background running state, the first device 1 switches the shopping application A to a foreground running state based on the instruction. If the shopping application A is not run, the first device 1 runs the shopping application A in the foreground based on the instruction.

Figure 4:
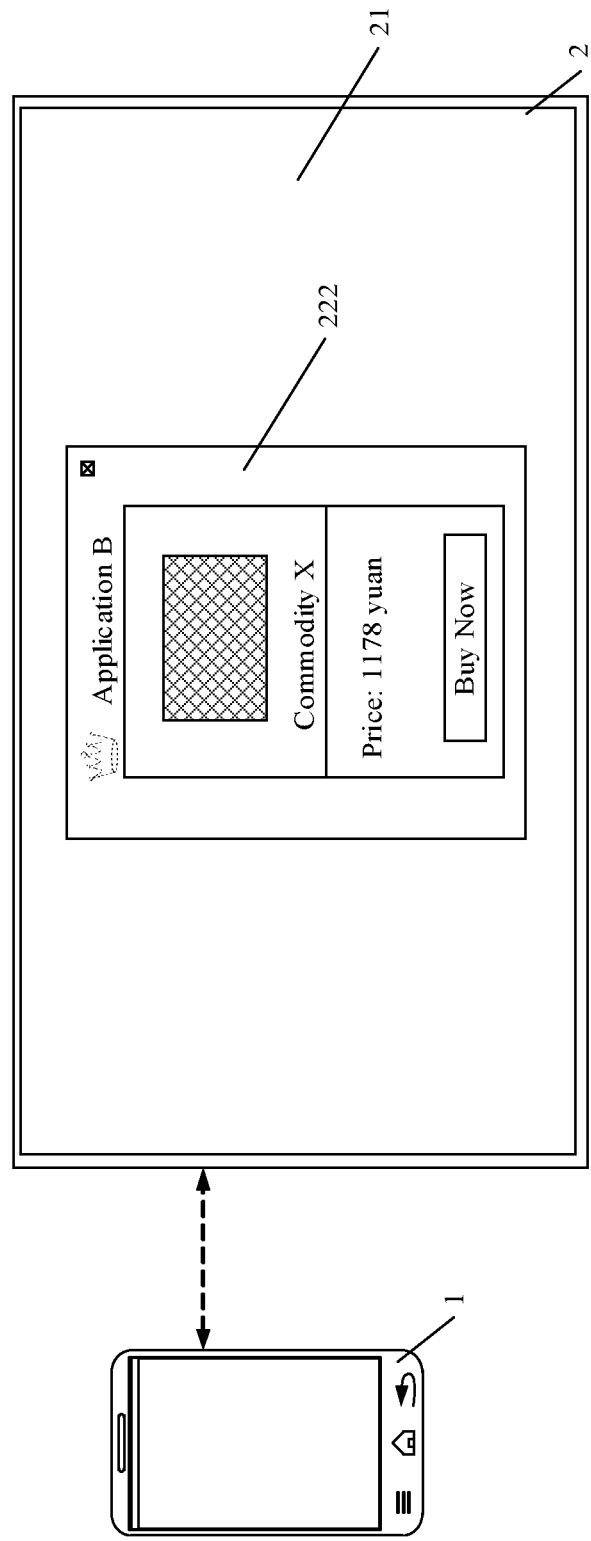
FIG. 4 is another schematic diagram in which a first device projects a running interface of an application onto a second device for display in the conventional technology.

In this case, in the example shown in FIG. 3, after the first device 1 projects the running interface of the shopping application A onto the second device 2 for displaying in the display interface 21 of the second device 2, a price "1219 yuan" of a "commodity X" can be viewed only in the window 221 by using the shopping application A. In this case, if the user wants to compare prices of the commodity in different shopping applications by viewing a price in the shopping application B, the user further needs to return to the display interface shown in FIG. 2, and click the icon of the shopping application B. The second device 2 sends an instruction to the first device through the connection relationship 3, to indicate the first device 1 that the icon of the shopping application B is clicked and the shopping application B needs to be run in the foreground. FIG. 4 is another schematic diagram in which the first device projects a running interface of an application onto the second device for display in the conventional technology. After receiving the instruction, the first device 1 runs the shopping application B in the foreground based on the instruction, and projects a running interface of the shopping application B onto the second device 2 for displaying in a window 222 in the display interface 21 of the second device 2. It should be noted that a manner in which the first device 1 projects the to-be-displayed content onto the second device 2 is not limited in the embodiments of this application, and various existing projection protocols may be used, for example, a push mode protocol such as a DLNA protocol, an airplay push protocol, or a lelink protocol, or a mirroring mode protocol such as a miracast mirroring protocol, an airplay mirroring protocol, or a lelink mirroring protocol.

It can be learned from FIG. 3 and FIG. 4 that, in an existing projection display technology, when the first device 1 projects a running interface of an application onto the second device 2 for displaying in the display interface 21 of the second device 2, the first device 1 projects a running interface of only one application onto the second device 2 for displaying in the display interface 21 of the second device 2 only after a tap operation performed by the user on an icon of the corresponding application is detected. To be specific, to display different applications in the window 221 and the window 222, the user still needs to consecutively return to the home screen shown in FIG. 2, successively click the icons of the corresponding applications, and drag different opened windows to simultaneously view running interfaces of the foregoing two different applications.

In the foregoing application scenario, the first device 1 cannot simultaneously project running interfaces of a plurality of shopping applications onto the second device 2 for displaying in the display interface 21 of the second device 2, even the plurality of shopping applications have been run in the background on the first device 1 before the first device 1 and the second device 2 establish the projection connection relationship, and a display interface of each shopping application is a price display interface of the "commodity X" when the shopping application is switched to the background running state. After the first device 1 and the second device 2 establish the projection relationship, the first device 1 can project a running interface of the corresponding shopping applications onto the second device 2 for displaying in the display interface 21 of the second device 2 only after the second device 2 successively detects click operations performed by the user on the icons of the shopping applications. Further, in a scenario such as a price comparison scenario, the first device 1 cannot more intelligently project running interfaces of shopping applications of a same type onto the display interface 21 of the second device 2, resulting in relatively low display control efficiency, and poor user experience when the user uses the first device 1 and the second device 2 to perform projection display.

Therefore, this application provides a display control method, an apparatus, and a system, which are applied to a process in which the first device performs projection onto the second device for display (if the first device is not in a projection display process, corresponding display is performed on a display of the first device in response to a user operation according to the conventional technology). After receiving an instruction to run a first application in the foreground, the first device determines at least one second application that is run in the background on the first device and that has same attribute information as the first application, and simultaneously projects a running interface of the first application and a running interface of the at least one second application onto the second device for displaying in a display interface of the second device, to improve display control efficiency and improve user experience when a user uses the first device and the second device to perform projection display.

Figure 5:
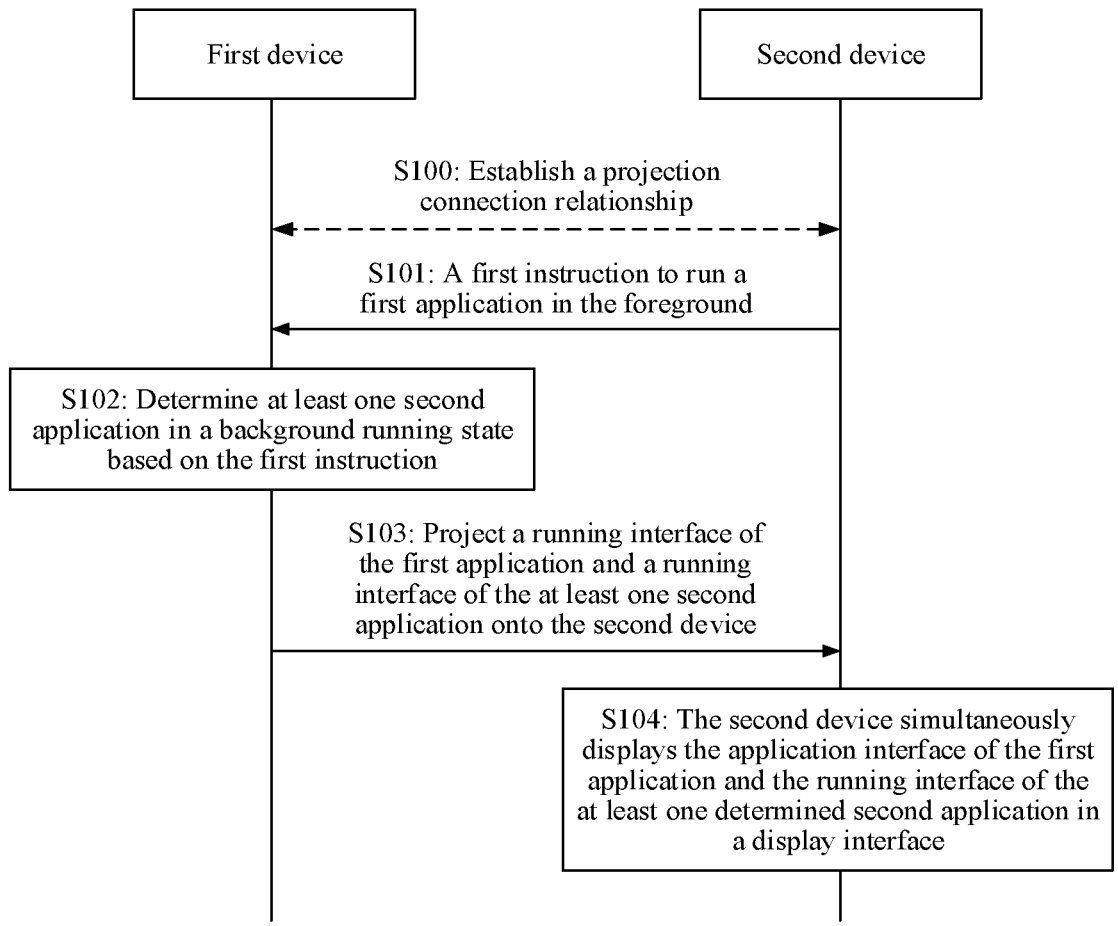
FIG. 5 is a schematic flowchart of a display control method according to this application.

The following describes the embodiments provided in this application with reference to accompanying drawings. FIG. 5 is a schematic flowchart of a display control method according to this application. The method shown in FIG. 5 may be performed by the first device and the second device in the application scenario shown in FIG. 1, and the first device and the second device jointly form a projection system. A projection connection relationship exists between the first device and the second device. The first device can project to-be-displayed content onto the second device through the projection connection relationship for displaying in a display interface of the second device. Specifically, the display control method provided in this embodiment includes the following steps.

S101: The first device receives a first instruction, where the first instruction is used to instruct the first device to run a first application in the foreground.

Specifically, in S101 in this embodiment, the first device receives the first instruction to run the first application in the foreground. In this case, the first application is not run, or the first application is in a background running state.

After the first device projects an icon control of the first application onto the second device for displaying in the display interface of the second device, the second device sends the first instruction to the first device after the second device detects an operation performed by a user on the icon control of the first application.

Figure 6:
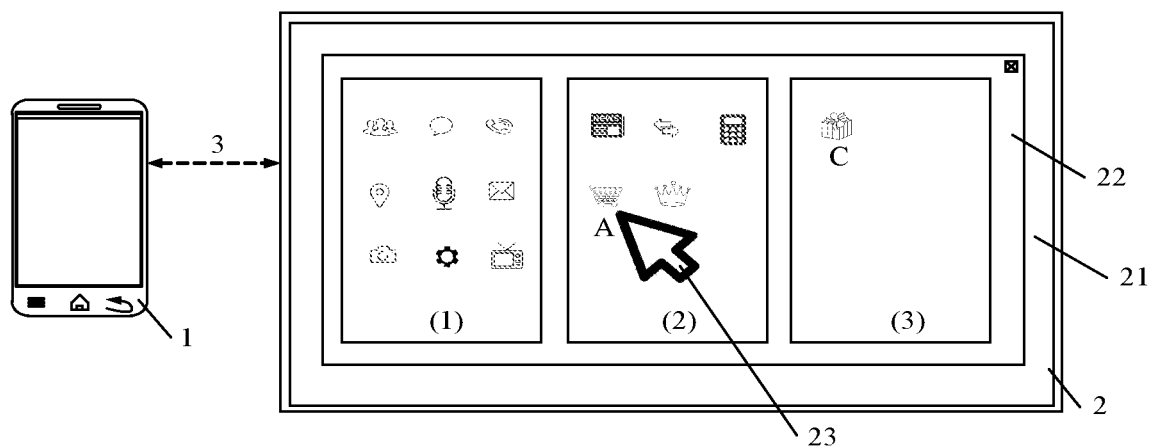
FIG. 6 is a schematic diagram of determining a first instruction in a display control method according to this application.

For example, FIG. 6 is a schematic diagram of determining the first instruction in the display control method according to this application. In the example shown in FIG. 6, a first device 1 and a second device 2 have established a projection connection relationship. Optionally, before S101 in this embodiment, the first device and the second device may further establish the projection connection relationship by using S100. A method in which the first device and the second device establish the projection connection relationship in this embodiment is not limited.

Subsequently, the first device 1 may project a home screen of the first device 1 onto the second device 2 for displaying in a display interface 21 of the second device 2. The home screen includes at least an icon control corresponding to the first application (a control corresponding to the first application is denoted as a third control in this embodiment of this application). Specifically, in the example shown in FIG. 6, an application A in the figure is denoted as the first application. In this case, after detecting a third target operation performed by the user on a control of the application A in the display interface 21, the second device 2 sends the first instruction to the first device. The third target operation may be a mouse click operation or a touch tap operation. For example, the second device 2 may send the first instruction to the first device after detecting a mouse click operation performed by the user on an icon of the application A by operating a mouse 23 displayed in the display interface 21. Alternatively, when the display interface 21 of the second device 2 is a touchscreen, the second device 2 may send the first instruction to the first device after detecting a touch tap operation performed by a finger of the user on the icon of the application A.

Optionally, the second device 2 specifically sends the first instruction to the first device 1 through the projection connection relationship 3 between the second device 2 and the first device 1. The first instruction may be used to instruct the first device 1 to run the application A in the foreground.

In this case, after receiving the first instruction, the first device 1 may directly determine, based on the first instruction, that the application A needs to be run in the foreground. Alternatively, the first instruction may be used to indicate that a target operation on the icon of the application A is detected. In this case, after receiving the first instruction, the first device 1 determines, based on the first instruction, that the target operation on the icon of the application A is detected, and further indirectly determines that the first application needs to be run in the foreground.

In addition, in the embodiment shown in FIG. 5, the second device may send the first instruction to the first device. In another possible implementation, the first instruction may alternatively be generated by operating the first device by the user. For example, the first device 1 may display the icon of the first application in a display interface 11 of the first device 1. After detecting an operation performed by the user on the icon of the first application displayed in the display interface 11, the first device 1 may determine, by using the operation, that the first application needs to be run in the foreground.

S102: When determining that the first device is in a display state of performing projection onto the second device, the first device determines, based on the first instruction received in S101, at least one second application in a background running state on the first device.

When receiving the first instruction, the first device needs to determine that the first device is performing projection onto the second device at this time, and then determines the at least one second application based on the first instruction. The display state of the first device includes at least a common display state in which the first device performs display on a display of the first device, and a projection display state in which the first device performs projection onto the second device for display. It may be understood that after the first device and the second device establish the projection connection in S100 in this embodiment, the first device is in the projection display state. That is, when the first device determines that the first device is in the state of performing projection onto the second device, the first device may perform this embodiment. However, to distinguish display states of the first device, the first device may set a flag bit. For example, a specified flag bit "1" may be used to indicate that the first device is in the projection display state, and a flag bit "0" is used to indicate that the first device is in the common display state. Alternatively, the first device may determine the display state of the first device by using a state machine or in another manner. This is not limited in this application.

Specifically, in S102 in this embodiment, attribute information of the at least one second application determined by the first device is the same as attribute information of the first application. Optionally, the attribute information includes but is not limited to a type of an application, a keyword in an application name, tag information of an application, and the like.

For example, in the example shown in FIG. 6, if the attribute information includes a type of an application, shopping applications on the first device 1 include the shopping application A, a shopping application B, and a shopping application C. It is assumed that the three shopping applications are all in the background running state. After receiving the first instruction to run the shopping application A in the foreground, the first device may determine, based on the first instruction, the shopping application B and the shopping application C that are also shopping applications in the background running state as the second applications.

Optionally, a type of an application in this embodiment may be a classification of the application in an application store, and include a game type, a shopping type, a life type, and the like. A specific classification manner of the application is not limited in this application.

For another example, if the attribute information includes a keyword such as "weather" in an application name, after receiving the first instruction to run a weather application in the foreground, the first device may determine, as the second application based on the first instruction, at least one another weather application whose name includes the keyword "weather".

For another example, if the attribute information includes tag information of an application, the tag information may be different tags added by the user of the first device for different applications. The first device may determine, as the second application based on the first instruction and the tags added by the user, an application with a same tag as the first application. The tag information may alternatively be from another device connected to the first device, or may be from a network server.

S103: The first device simultaneously projects a running interface of the first application and a running interface of the at least one second application determined in S102 onto the second device. Therefore, in S104, the second device may simultaneously display the running interface of the first application and the running interface of the at least one determined second application in the display interface of the second device based on the content projected by the first device in S103.

After the first device determines the at least one second application in S102, the first device simultaneously projects, based on the first instruction, the running interface of the first application and the running interface of the at least one second application onto the second device for displaying in the display interface of the second device.

Figure 7:
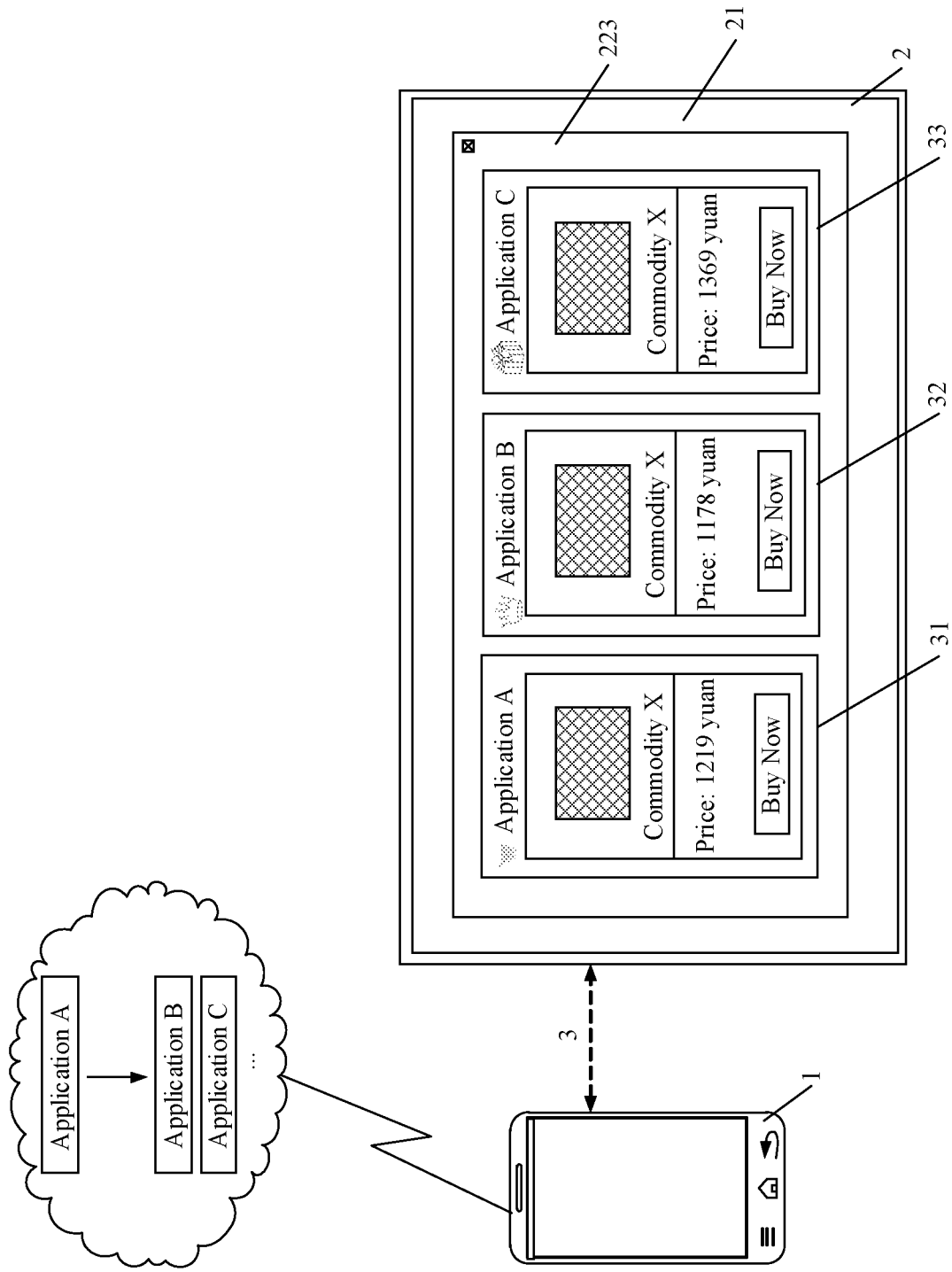
FIG. 7 is a display schematic diagram of a display interface of a second device according to this application.

Specifically, FIG. 7 is a display schematic diagram of the display interface of the second device according to this application. In the example shown in FIG. 7, based on the example shown in FIG. 6, after the first device determines the shopping application B and the shopping application C with the same attribute as the shopping application A in the background running state based on the shopping application A, the first device may simultaneously project a running interface 31 of the shopping application A, a running interface 32 of the shopping application B, and a running interface 33 of the shopping application C onto the second device 2 through the projection connection relationship 3, so that the second device 2 simultaneously displays the running interface 31 of the shopping application A, the running interface 32 of the shopping application B, and the running interface 33 of the shopping application C in the display interface 21. Optionally, the second device 2 may simultaneously display the running interface 31 of the shopping application A, the running interface 32 of the shopping application B, and the running interface 33 of the shopping application C in a same window 223 in the display interface 21.

In this case, after the display interface 21 of the second device 2 simultaneously displays the running interface 31 of the shopping application A, the running interface 32 of the shopping application B, and the running interface 33 of the shopping application C, the user may simultaneously view prices of a commodity X in different shopping applications in the display interface 21 of the second device 2. In addition, an operation may be separately performed on the applications corresponding to the running interfaces by using the running interfaces of the different applications.

Optionally, in this embodiment, when the first device projects the running interface of the at least one second application that is run in the background onto the second device for displaying in the display interface of the second device, a running interface of each second application is the same as a running interface displayed before the second application is switched to the background running state. Specifically, it is assumed that before the first device 1 and the second device 2 establish the projection connection relationship, after the user of the first device 1 successively opens the shopping applications A to C on the first device 1, and views a price interface of the "commodity X" in each shopping application, the shopping applications are switched to the background running state. In the example shown in FIG. 7, after the first device determines the shopping application B and the shopping application C based on the first instruction to run the shopping application A in the foreground, the running interface 31 of the shopping application A, the running interface 32 of the shopping application B, and the running interface 33 of the shopping application C that are projected onto the display interface 21 of the second device 2 are all price interfaces of the "commodity X".

In conclusion, in the display control method provided in this embodiment, when the first device performs projection onto the second device for display, after the first device receives the instruction to run the first application in the foreground, the first device determines the at least one second application that is run in the background on the first device and that has the same attribute information as the first application, and simultaneously projects the running interface of the first application and the running interface of the at least one second application onto the second device for displaying in the display interface of the second device. Therefore, the first device can automatically project running interfaces of more applications with same attribute information onto the second device based on a viewing requirement of a user for an application, so that the second device can simultaneously display, in the display interface, the running interface of the first application and the running interface of the at least one second application that has the same attribute information as the first application, to meet a requirement of the user for simultaneously viewing applications with same attribute information. Particularly, when the display control method provided in this embodiment is applied to an application scenario such as a price comparison scenario, after the user has separately viewed prices of a same product on the first device by using a plurality of shopping applications, and switches the shopping applications to the background running state, the first device may project, based on an instruction of the user to view one of the shopping applications, all the shopping applications that have been opened by the user onto the second device, so that the second device simultaneously displays all the shopping applications that have been opened in the display interface of the second device, to improve display control efficiency of an application, and also improve user experience when the user uses the first device and the second device to perform projection display.

Further, in the embodiment shown in FIG. 5 to FIG. 7, after determining, based on the first instruction, the at least one second application that has the same attribute as the first application in S102, the first device directly simultaneously projects the running interface of the first application and the running interfaces of all the second applications onto the second device in S103 for displaying in the display interface of the second device. Specifically, rendered data that includes the running interface of the first application and the running interfaces of all the second applications may be sent to the second device, and the second device directly displays the rendered data after receiving the rendered data. Alternatively, data of the running interface of the first application and the running interfaces of all the second applications may be sent to the second device, and the running interfaces are instructed to be simultaneously displayed in a same interface. After receiving the data, the second device performs rendering and display, so that the running interface of the first application and the running interface of the second application are simultaneously displayed in the display interface of the second device. Certainly, the data of the running interface of the first application and the running interface of the second application may also be transferred between the first device and the second device in another manner, so that the running interface of the first application and the running interface of the second application are simultaneously displayed in the display interface of the second device. To meet requirements of different application scenarios, based on the foregoing embodiment, this application further provides a method in which after the first device determines, based on the first instruction, at least one second application that has the same attribute as the first application in S102, the first device projects only the running interface of the first application and a first control onto the display interface of the second device for display, and simultaneously projects the running interface of the first application and the running interfaces of all the second applications onto the second device for displaying in the display interface of the second device only after detecting a first target operation performed by the user on the first control. The following provides description with reference to accompanying drawings.

Figure 8:
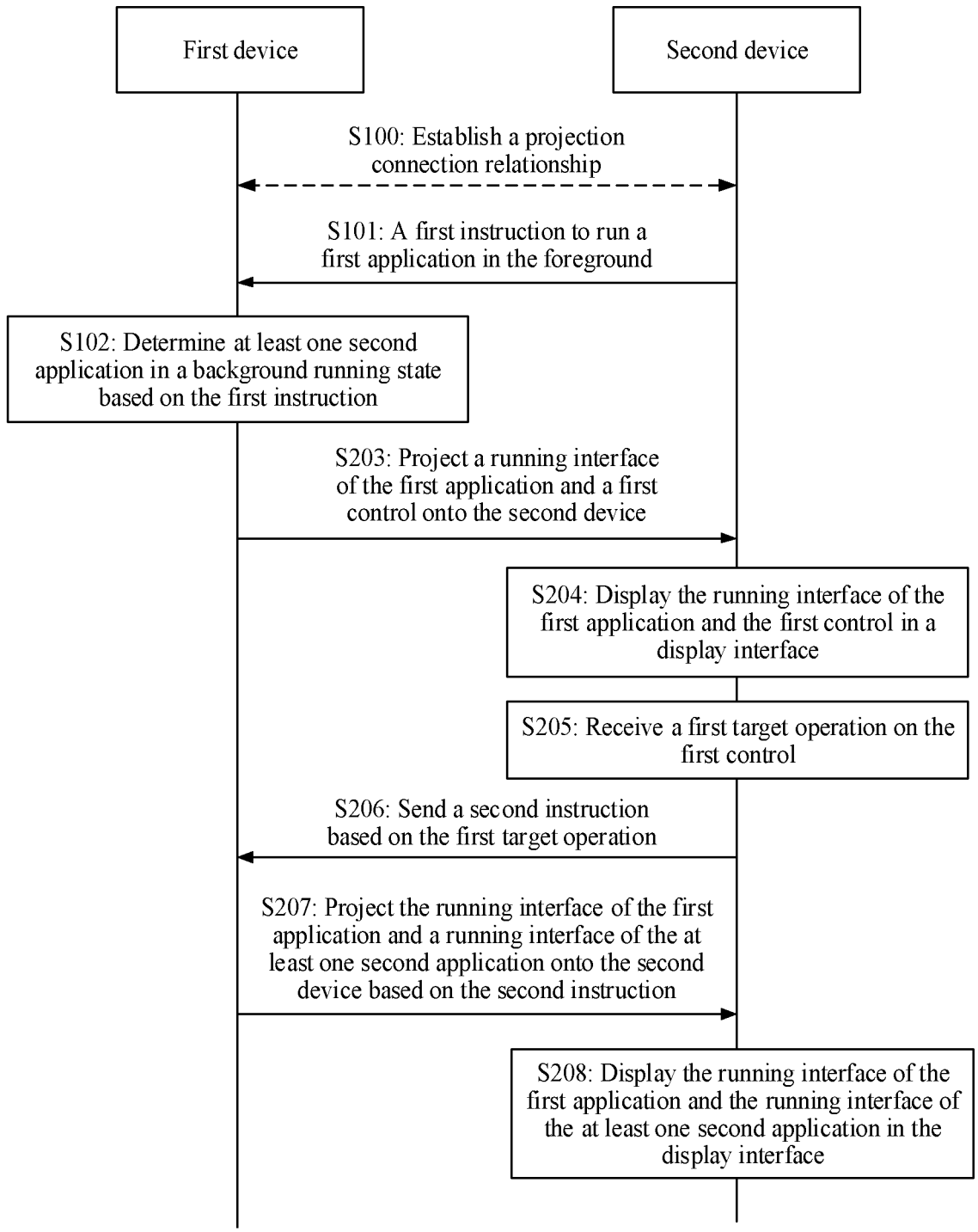
FIG. 8 is a schematic flowchart of another display control method according to this application.

FIG. 8 is a schematic flowchart of another display control method according to this application. The method shown in FIG. 8 may be applied to the application scenario shown in FIG. 1. For S100 to S102 of the method, refer to descriptions in the embodiment shown in FIG. 5. Implementations and principles thereof are the same, and details are not described again. After S102, the method shown in FIG. 8 further includes the following steps.

S203: The first device projects only an application interface of the first application onto the second device based on the first instruction for displaying in a display interface of the second device. In addition, the first device further projects a first control onto the second device for displaying in the display interface of the second device. In S204, the second device simultaneously displays the running interface of the first application and the first control in the display interface of the second device based on the content projected by the first device in S203.

Figure 9:
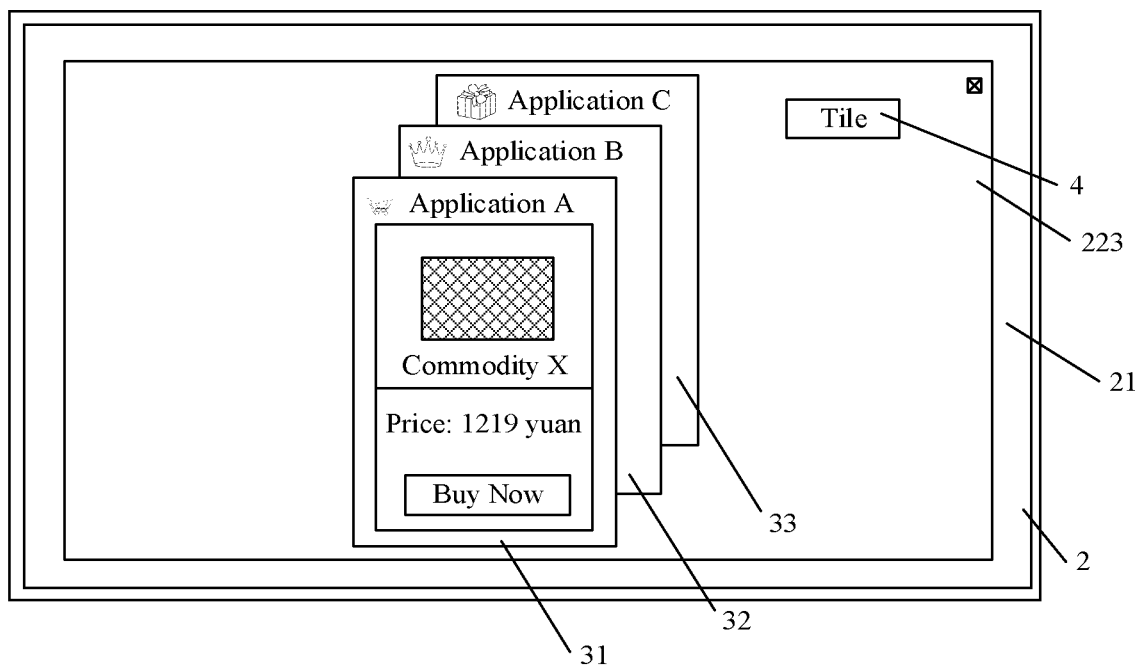
FIG. 9 is a schematic diagram of a display mode 1 of a display interface of a second device according to this application.

For example, FIG. 9 is a schematic diagram of a display mode 1 of the display interface of the second device according to this application. In the example shown in FIG. 9, a shopping application A is recorded as the first application, and a shopping application B and a shopping application are recorded as second applications. The first device 1 projects a running interface 31 of the shopping application A onto the second device 2 based on the first instruction, so that the second device 2 displays the running interface 31 of the application A in a display interface 21 of the second device 2. At the same time, the first device 1 further projects a first control 4 onto the second device 2, so that the second device 2 further displays the first control 4 in the display interface of the second device 2. The first control may be used to simultaneously display the shopping applications A to C. The first control is "tile" in the example shown in FIG. 9. A display form of the first control is not limited in this application.

Optionally, in a specific implementation of this embodiment, in S203, the first device may further project the at least one determined second application onto the second device in stacked mode, so that the second device displays the at least one second application in the display interface of the second device in the stacked mode. For example, in the example shown in FIG. 9, after the first device determines the shopping application B and the shopping application C that have the same attribute information as the shopping application A, the first device projects a part of the running interface 32 of the shopping application B and a part of the running interface 33 of the shopping application C onto the second device 2 in the stacked mode, so that the second device 2 displays the part of the running interface 32 of the shopping application B and the part of the running interface 33 of the shopping application C that are stacked in the display interface 21. The running interface 32 and the running interface 33 that are stacked may be located behind the running interface 31, and only a title and icon information of an application are displayed, but specific content in the running interface is not displayed. Alternatively, the running interface 32 and the running interface 33 may be completely covered by the running interface 31, and only indication information is displayed to notify a user that a covered interface exists.

S205: The second device receives a first target operation performed by the user on the first control.

S206: The second device sends a second instruction to the first device based on the first target operation.

Subsequently, after the first control is projected onto the display interface of the second device for display, the second device may detect the first target operation performed by the user on the first control in S205. After detecting the first target operation performed by the user on the first control, the second device sends the second instruction to the first device in S206.

The second instruction is generated by the second device in response to the first target operation performed by the user on the first control. Optionally, the first target operation in this embodiment may be a mouse click operation or a touch tap operation on the first control. The second instruction may be used to directly instruct the first device to simultaneously display the running interface of the first application and the running interface of the at least one second application. Alternatively, the second instruction may be used to indicate that the first target operation on the first control is detected. Alternatively, the second instruction is generated by the first device based on the indication that the first target operation on the first control is detected that is sent by the second device after detecting the first target operation on the first control.

S207: After receiving the second instruction, the first device projects the running interface of the first application and the running interface of the at least one second application onto the second device based on the second instruction. Therefore, in S208, the second device may simultaneously display the running interface of the first application and the running interface of the at least one determined second application in the display interface of the second device based on the content projected by the first device in S207.

After receiving the second instruction sent by the second device, the first device simultaneously projects the running interface of the first application and the running interface of the at least one second application onto the second device for displaying in the display interface of the second device.

Figure 10:
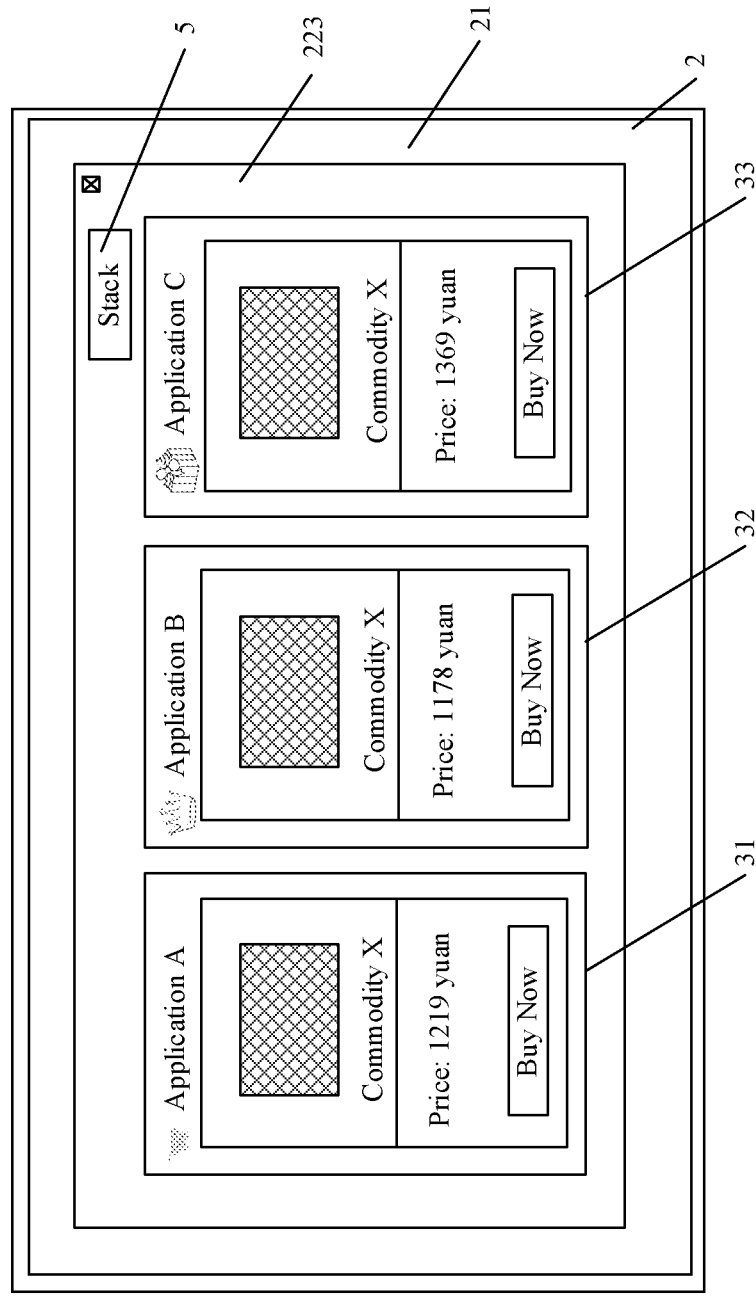
FIG. 10 is a schematic diagram of a display mode 2 of a display interface of a second device according to this application.

For example, FIG. 10 is a schematic diagram of a display mode 2 of the display interface of the second device according to this application, and shows schematic diagrams displayed by the second device 2 in the display interface 21 after the second device 2 detects the first target operation on the first control 4, and the first device simultaneously projects the running interface 31 of the shopping application A, the running interface 32 of the shopping application B, and the running interface 33 of the shopping application C onto the second device 2. The second device 2 displays the complete running interface 32 of the shopping application B and the complete running interface 33 of the shopping application C in the display interface 21.

Optionally, in a display process in which the first device 1 switches, based on the second instruction, a state of displaying the running interface 32 of the shopping application B and the running interface 33 of the shopping application C in stacked mode in FIG. 9 to a state of displaying the running interface 32 and the running interface 33 in tile mode side by side in FIG. 10, continuous animation effects may be added to enhance a display effect.

Further, in the example shown in FIG. 10, the first device 1 not only projects the running interface of the first application and the running interface of the at least one second application onto the second device for displaying in the display interface of the second device, but also projects a second control onto the display interface of the second device for display.

For example, in the example shown in FIG. 10, the first device 1 projects a second control 5 onto the second device 2, and the second device 2 displays the second control 5 projected by the first device 1 in the display interface 21. In this case, the second device 2 detects a second target operation performed by the user on the second control 5, and after detecting the second target operation performed by the user on the second control 5, the second device sends a third instruction to the first device.

The third instruction is generated by the second device in response to the second target operation performed by the user on the second control. Optionally, the second target operation in this embodiment may be a mouse click operation or a touch tap operation on the second control. The third instruction may be used to directly instruct the second device to display the stacked running interface of the at least one second application. Alternatively, the third instruction may be used to indicate that the second target operation on the second control is detected.

After receiving the third instruction sent by the second device, the first device projects the running interface of the first application onto the second device for displaying in the display interface of the second device, and projects the staked running interface of the at least one application onto the second device for displaying in the display interface of the second device. A display effect after switching may be shown in FIG. 9.

In conclusion, in the display control method provided in this embodiment, when the first device performs projection onto the second device for display, after the first device receives the instruction to run the first application in the foreground, the first device determines at least one second application that is run in the background on the first device and that has the same attribute information as the first application, and does not directly project the running interfaces of all the applications onto the second device, but only project the running interface of the first application corresponding to the instruction and the first control onto the second device, so that the second device first displays the first control and the running interface of the first application in the display interface. Subsequently, the first device simultaneously projects the running interface of the first application and running interfaces of all the second applications onto the second device based on the second instruction for displaying in the display interface of the second device only after the second device detects the first target operation on the first control and sends the second instruction to the first device. Therefore, requirements in different application scenarios can be met. The first device displays the at least one second application in tile mode only after the user clicks the first control and the second device detects the first target operation on the first control. Therefore, more functions can be provided by the display control method, display control efficiency of an application is further improved, and user experience when the user uses the first device and the second device to perform projection display is improved.

In the embodiments provided in this application, the methods provided in the embodiments of this application are described from perspectives of the first device, the second device, and interaction between the first device and the second device. To implement functions in the foregoing methods provided in the embodiments of this application, the first device and the second device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 11:
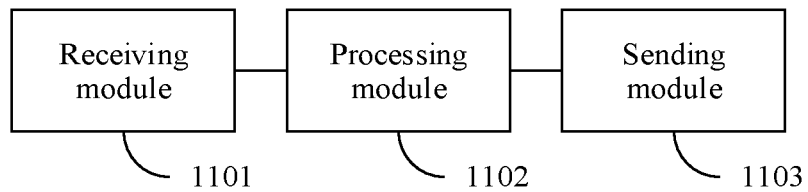
FIG. 11 is a schematic diagram of a structure of a display control apparatus according to this application.

FIG. 11 is a schematic diagram of a structure of a display control apparatus according to this application. The display control apparatus shown in FIG. 11 may be the first device in the foregoing embodiments, and may be configured to perform a function of the first device. Specifically, the display control apparatus includes a receiving module 1101, a processing module 1102, and a sending module 1103.

When the display control apparatus determines that the display control apparatus is in a state of performing projection onto a second device, the receiving module 1101 is configured to receive a first instruction, where the first instruction is used to instruct the first device to run a first application in the foreground; the processing module 1102 is configured to: when determining that the display control apparatus is in the display state of performing projection onto the second device, determine at least one second application on the first device based on the first instruction, where attribute information of the second application is the same as that of the first application, and the second application is in a background running state; and the sending module 1103 is configured to project a running interface of the first application and a running interface of the at least one determined second application onto the second device, so that the running interface of the first application and the running interface of the at least one determined second application are simultaneously displayed in a display interface of the second device.

Optionally, in this embodiment, the sending module 1103 is specifically configured to project the running interface of the first application and a first control onto the second device, so that the running interface of the first application and the first control are simultaneously displayed in the display interface of the second device. The receiving module 1101 is further configured to receive a second instruction sent by the second device. The sending module 1103 is specifically configured to project the running interface of the first application and the running interface of the at least one determined second application onto the second device based on the second instruction, so that the running interface of the first application and the first control are simultaneously displayed in the display interface of the second device.

Optionally, the second instruction is generated by the second device in response to a first target operation performed by a user on the first control; or the second instruction is generated by the first device in response to a first target operation performed by a user on the first control.

Optionally, in this embodiment, the sending module 1103 is specifically configured to project the running interface of the first application, the first control, and the stacked running interface of the at least one second application onto the second device, so that the running interface of the first application, the first control, and the stacked running interface of the at least one second application are simultaneously displayed in the display interface of the second device.

Optionally, in this embodiment, the sending module 1103 is specifically configured to project the tile running interface of the at least one second application and the running interface of the first application onto the second device based on the second instruction, so that the running interface of the first application and the running interface of the at least one second application are displayed in the display interface of the second device in tile mode side by side.

Optionally, in this embodiment, the sending module 1103 is specifically configured to project the running interface of the first application, the running interface of the at least one determined second application, and a second control onto the second device based on the second instruction, so that the running interface of the first application, the running interface of the at least one determined second application, and the second control are simultaneously displayed in the display interface of the second device. The receiving module 1101 is further configured to receive a third instruction sent by the second device, where the third instruction is generated in response to a second target operation performed by the user on the second control. The sending module 1103 is specifically configured to project the running interface of the first application, the first control, and the stacked running interface of the at least one second application onto the second device based on the third instruction, so that the running interface of the first application, the first control, and the stacked running interface of the at least one second application are simultaneously displayed in the display interface of the second device.

Optionally, in this embodiment, the sending module 1103 is further configured to project a third control corresponding to the first application onto the second device, so that the third control is displayed in the display interface of the second device.

Optionally, in this embodiment, the attribute information includes a type of an application, a keyword in an application name, or tag information of an application.

Optionally, in this embodiment, when the sending module 1103 projects the running interface of the at least one second application that is run in the background onto the second device, a running interface of each second application is the same as a running interface displayed before the second application is switched to the background running state.

The display control apparatus provided in this embodiment may be used as a first device to perform any display control method in the foregoing embodiments. Implementations and principles thereof are the same, and details are not described again.

Division into the modules in the embodiments of this application is an example, is merely division into logical functions, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 12:
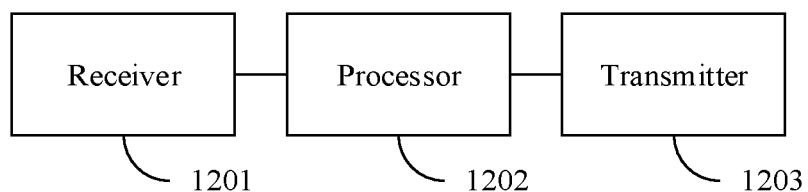
FIG. 12 is a schematic diagram of a structure of an electronic device with a projection capability according to this application.

FIG. 12 is a schematic diagram of a structure of an electronic device with a projection capability according to this application. The electronic device shown in FIG. 12 may be the first device in the foregoing embodiments, and may be configured to perform a function of the first device. Specifically, the electronic device includes a receiver 1201, a processor 1202, and a transmitter 1203. The processor 1202 is coupled to the transmitter 1203 and the receiver 1201.

When the electronic device determines that the electronic device is in a state of performing projection onto a second device, the receiver 1201 is configured to receive a first instruction, where the first instruction is used to instruct the first device to run a first application in the foreground; the processor 1202 is configured to: when determining that the electronic device is in the display state of performing projection onto the second device, determine at least one second application on the first device based on the first instruction, where attribute information of the second application is the same as that of the first application, and the second application is in a background running state; and the transmitter 1203 is configured to project a running interface of the first application and a running interface of the at least one determined second application onto the second device, so that the running interface of the first application and the running interface of the at least one determined second application are simultaneously displayed in a display interface of the second device.

Optionally, in this embodiment, the transmitter 1203 is specifically configured to project the running interface of the first application and a first control onto the second device, so that the running interface of the first application and the first control are simultaneously displayed in the display interface of the second device. The receiver 1201 is further configured to receive a second instruction sent by the second device. The transmitter 1203 is specifically configured to project the running interface of the first application and the running interface of the at least one determined second application onto the second device based on the second instruction, so that the running interface of the first application and the first control are simultaneously displayed in the display interface of the second device.

Optionally, the second instruction is generated by the second device in response to a first target operation performed by a user on the first control; or the second instruction is generated by the first device in response to a first target operation performed by a user on the first control.

Optionally, in this embodiment, the transmitter 1203 is specifically configured to project the running interface of the first application, the first control, and the stacked running interface of the at least one second application onto the second device, so that the running interface of the first application, the first control, and the stacked running interface of the at least one second application are simultaneously displayed in the display interface of the second device.

Optionally, in this embodiment, the transmitter 1203 is specifically configured to project the tile running interface of the at least one second application and the running interface of the first application onto the second device based on the second instruction, so that the running interface of the first application and the running interface of the at least one second application are displayed in the display interface of the second device in tile mode side by side.

Optionally, in this embodiment, the transmitter 1203 is specifically configured to project the running interface of the first application, the running interface of the at least one determined second application, and a second control onto the second device based on the second instruction, so that the running interface of the first application, the running interface of the at least one determined second application, and the second control are simultaneously displayed in the display interface of the second device. The receiver 1201 is further configured to receive a third instruction sent by the second device, where the third instruction is generated in response to a second target operation performed by the user on the second control. The transmitter 1203 is specifically configured to project the running interface of the first application, the first control, and the stacked running interface of the at least one second application onto the second device based on the third instruction, so that the running interface of the first application, the first control, and the stacked running interface of the at least one second application are simultaneously displayed in the display interface of the second device.

Optionally, in this embodiment, the transmitter 1203 is further configured to project a third control corresponding to the first application onto the second device, so that the third control is displayed in the display interface of the second device.

Optionally, in this embodiment, the attribute information includes a type of an application, a keyword in an application name, or tag information of an application.

Optionally, in this embodiment, when the transmitter 1203 projects the running interface of the at least one second application that is run in the background onto the second device, a running interface of each second application is the same as a running interface displayed before the second application is switched to the background running state.

The display control apparatus provided in this embodiment may be used as a first device to perform any display control method in the foregoing embodiments. Implementations and principles thereof are the same, and details are not described again.

Figure 13:
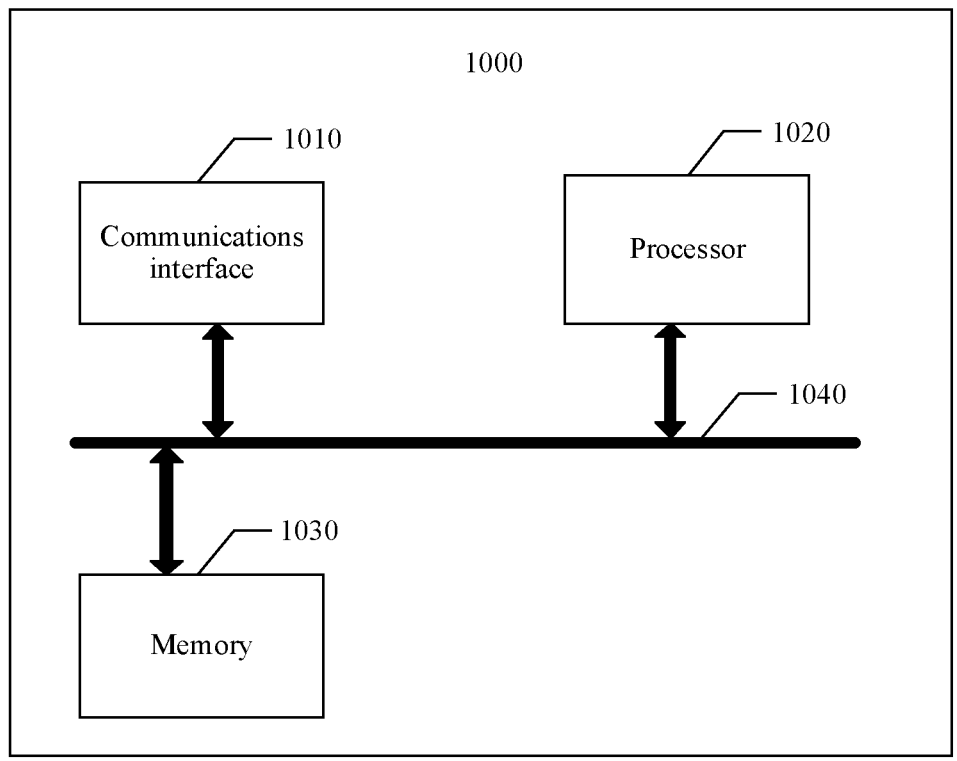
FIG. 13 is a schematic diagram of a structure of an apparatus according to this application.

FIG. 13 is a schematic diagram of a structure of an apparatus according to this application. In a specific implementation, an apparatus 1000 shown in FIG. 13 may be a terminal device, and the terminal device may serve as the first device in any one of the foregoing embodiments of this application, and perform a function of the first device. Alternatively, the apparatus 1000 may be a chip system in the first device, and the chip system may include one or more chips, or may include a chip and another discrete component.

Specifically, the apparatus 1000 includes at least one processor 1020 and at least one memory 1030. The memory 1030 is configured to store program instructions and/or data. The memory 1030 is coupled to the processor 1020. Coupling in this embodiment of this application may be indirect coupling or a communication connection between apparatuses, units, or modules in an electrical form, a mechanical form, or another form, and is used for information exchange between the apparatuses, the units, or the modules. The processor 1020 may cooperate with the memory 1030.

For example, the apparatus 1000 shown in FIG. 13 is a terminal device. When the processor 1020 in the apparatus 1000 invokes and executes the program instructions stored in the memory 1030, the processor 1020 performs the following steps: receiving a first instruction through a communications interface 1010, where the first instruction is used to instruct the first device to run a first application in the foreground; when determining that the terminal device is in a display state of performing projection onto a second device, determining at least one second application on the first device based on the first instruction, where attribute information of the second application is the same as that of the first application, and the second application is in a background running state; and projecting a running interface of the first application and a running interface of the at least one determined second application onto the second device through the communications interface 1010, so that the running interface of the first application and the running interface of the at least one determined second application are simultaneously displayed in a display interface of the second device.

Optionally, in this embodiment, the processor 1020 further specifically projects the running interface of the first application and a first control onto the second device through the communications interface 1010, so that the running interface of the first application and the first control are simultaneously displayed in the display interface of the second device; receives, through the communications interface 1010, a second instruction sent by the second device; and projects the running interface of the first application and the running interface of the at least one determined second application onto the second device through the communications interface 1010 based on the second instruction, so that the running interface of the first application and the running interface of the at least one determined second application are simultaneously displayed in the display interface of the second device.

Optionally, in this embodiment, the processor 1020 specifically projects the running interface of the first application, the first control, and the stacked running interface of the at least one second application onto the second device through the communications interface 1010, so that the running interface of the first application, the first control, and the stacked running interface of the at least one second application are simultaneously displayed in the display interface of the second device.

Optionally, in this embodiment, the processor 1020 specifically projects the tile running interface of the at least one second application and the running interface of the first application onto the second device based on the second instruction, so that the running interface of the first application and the running interface of the at least one second application are displayed in the display interface of the second device in tile mode side by side.

Optionally, in this embodiment, the processor 1020 specifically projects the running interface of the first application, the running interface of the at least one determined second application, and a second control onto the second device based on the second instruction, so that the running interface of the first application, the running interface of the at least one determined second application, and the second control are simultaneously displayed in the display interface of the second device. The processor 1020 further receives, through the communications interface 1010, a third instruction sent by the second device. The processor 1020 specifically projects the running interface of the first application, the first control, and the stacked running interface of the at least one second application onto the second device through the communications interface 1010 based on the third instruction, so that the running interface of the first application, the first control, and the stacked running interface of the at least one second application are simultaneously displayed in the display interface of the second device.

Optionally, in this embodiment, the processor 1020 further projects a third control corresponding to the first application onto the second device through the communications interface 1010, so that the third control is displayed in the display interface of the second device.

Optionally, in this embodiment, the attribute information includes a type of an application, a keyword in an application name, or tag information of an application.

Optionally, in this embodiment, when the processor 1020 projects the running interface of the at least one second application that is run in the background onto the second device through the communications interface 1010, a running interface of each second application is the same as a running interface displayed before the second application is switched to the background running state.

The terminal device provided in this embodiment may be used as a first device to perform any display control method in the foregoing embodiments. Implementations and principles thereof are the same, and details are not described again.

This embodiment of this application does not limit a specific connection medium between the communications interface 1010, the processor 1020, and the memory 1030. In this embodiment of this application, the memory 1030, the processor 1020, and the communications interface 1010 are connected through a bus 1040 in FIG. 13, and the bus is represented by a bold line in FIG. 13. A manner of connection between other components is schematically described, and is not limited thereto. The bus may be classified into an address bus, a data bus, a control bus, and the like. For ease of representation, only one bold line is used to represent the bus in FIG. 10, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

In the embodiments of this application, a memory may be a non-volatile memory such as a hard disk drive (hard disk drive, HDD) or a solid-state drive (solid-state drive, SSD), or may be a volatile memory (volatile memory) such as a random-access memory (random-access memory, RAM). The memory is any other medium that can carry or store expected program code in a form of an instruction or a data structure and that can be accessed by a computer, but is not limited thereto. The memory in the embodiments of this application may alternatively be a circuit or any other apparatus that can implement a storage function, and is configured to store the program instructions and/or the data.

All or some of the methods in the embodiments of this application may be implemented by using software, hardware, firmware, or any combination thereof. When being implemented by using the software, all or some of the methods may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clearly that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A method implemented by a first device that supports projection, wherein the method comprises:
    receiving a first instruction instructing the first device to run a first application in a foreground;
    determining a second application on the first device based on the first instruction when the first device is in a display state of performing projection onto a second device, wherein attribute information of the second application is the same as that of the first application, and wherein the second application is in a background running state; and
    projecting a first running interface of the first application and a second running interface of the second application onto the second device to enable the second device to simultaneously display the first running interface and the second running interface in the second device.

2. The method of claim 1, further comprising:
    projecting the first running interface and a first control onto the second device to enable the second device to simultaneously display the first running interface and the first control in the second device;
    obtaining a second instruction in response to a first target operation performed by a user on the first control; and
    further projecting the first running interface and the second running interface onto the second device based on the second instruction to enable the second device to simultaneously display the first running interface and the second running interface in the second device.

3. The method of claim 2, further comprising projecting the first running interface, the first control, and a stacked running interface of the second application onto the second device to enable the second device to simultaneously display the first running interface, the first control, and the stacked running interface in the display interface.

4. The method of claim 3, further comprising projecting a tile running interface of the second application and the first running interface onto the second device based on the second instruction to enable the second device to simultaneously display the first running interface and the second running interface in the second device in a tile mode side by side.

5. The method of claim 2, further comprising receiving, from the second device, the second instruction.

6. The method of claim 2, further comprising:
    projecting the first running interface, the second running interface, and a second control onto the second device based on the second instruction to enable the second device to simultaneously display the first running interface, the second running interface, and the second control in the second device; obtaining a third instruction in response to a second target operation performed by the user on the second control; and
    projecting the first running interface, the first control, and a stacked running interface of the second application onto the second device based on the third instruction to enable the second device to simultaneously display the first running interface, the first control, and the stacked running interface the second device.

7. The method of claim 2, further comprising generating the second instruction in response to the first target operation performed by the user on the first control.

8. The method of claim 1, wherein the attribute information comprises at least one of a type of an application, a keyword in an application name, or tag information of the application.

9. An electronic device comprising:
    a memory configured to store instructions;
    a processor coupled to the memory, wherein when executed by the processor the instructions cause the electronic device to:
        receive a first instruction instructing the electronic device to run a first application in a foreground;
        determine a second application on the electronic device based on the first instruction when the electronic device is in a display state of performing projection onto an outside device, wherein attribute information of the second application is the same as that of the first application, and wherein the second application is in a background running state; and
        project a first running interface of the first application and a second running interface of the second application onto the outside device to enable the outside device to simultaneously display the first running interface and the second running interface in the outside device.

10. The electronic device of claim 9, wherein when executed by the processor, the instructions further cause the electronic device to:
    project the first running interface and a first control onto the outside device to enable the outside device to simultaneously display the first running interface and the first control in the outside device;

obtain a second instruction in response to a first target operation performed by a user on the first control; and further project the first running interface and the second running interface onto the outside device based on the second instruction to enable the outside device to simultaneously display the first running interface and the second running interface in the outside device.

11. The electronic device of claim 10, wherein when executed by the processor, the instructions further cause the electronic device to receive, from the outside device, the second instruction.

12. The electronic device of claim 10, wherein when executed by the processor, the instructions further cause the electronic device to project the first running interface, the first control, and a stacked running interface of the second application onto the outside device to enable the outside device to simultaneously display the first running interface, the first control, and the stacked running interface in the outside device.

13. The electronic device of claim 12, wherein when executed by the processor, the instructions further cause the electronic device to project a tile running interface of the second application and the first running interface onto the outside device based on the second instruction to enable the outside device to simultaneously display the first running interface and the second running interface in the outside device in a tile mode side by side.

14. The electronic device of claim 10, wherein when executed by the processor, the instructions further cause the electronic device to:

project the first running interface, the second running interface, and a second control onto the outside device based on the second instruction to enable the outside device to simultaneously display the first running interface, the second running interface, and the second control in the outside device;

obtain a third instruction in response to a second target operation performed by the user on the second control; and project the first running interface, the first control, and a stacked running interface of the second application onto the outside device based on the third instruction to enable the outside device to simultaneously display the first running interface, the first control, and the stacked running interface in the outside device.

15. The electronic device of claim 10, wherein when executed by the processor, the instructions further cause the electronic device to generate the second instruction in response to the first target operation performed by the user on the first control.

16. The electronic device of claim 9, wherein the attribute information comprises at least one of a type of an application, a keyword in an application name, or tag information of the application.

17. A computer program product comprising computer-executable instructions that are stored on a non-transitory computer-readable medium and that, when executed by a processor, cause an electronic device to:

receive a first instruction instructing the electronic device to run a first application in a foreground;

determine a second application on the electronic device based on the first instruction when the electronic device is in a display state of performing projection onto an outside device, wherein attribute information of the second application is the same as that of the first application, and wherein the second application is in a background running state; and project a first running interface of the first application and a second running interface of the second application onto the outside device to enable the outside device to simultaneously display the first running interface and the second running interface in the outside device.

18. The computer program product of claim 17, wherein the computer-executable instructions further cause the electronic device to:

project the first running interface and a first control onto the outside device to enable the outside device to simultaneously display the first running interface and the first control in the display interface;

obtain a second instruction in response to a first target operation performed by a user on the first control; and further project the first running interface and the second running interface onto the outside device based on the second instruction to enable the outside device to simultaneously display the first running interface and the second running interface in the outside device.

19. The computer program product of claim 18, wherein the computer-executable instructions further cause the electronic device to receive, from the outside device, the second instruction.

20. The computer program product of claim 18, wherein the computer-executable instructions further cause the electronic device to project the first running interface, the first control, and a stacked running interface of the second application onto the outside device to enable the outside device to simultaneously display the first running interface, the first control, and the stacked running interface in the outside device.

* * * * *

UNITED STATES PATENT AND TRADEMARK OFFICE
CERTIFICATE OF CORRECTION

PATENT NO. : 11,880,629 B2
APPLICATION NO. : 17/625550
DATED : January 23, 2024
INVENTOR(S) : Hejin Gu It is certified that error appears in the above-identified patent and that said Letters Patent is hereby corrected as shown below:

In the Claims

Claim 6, Column 30, Line 33: "running interface the second device." should read "running interface in the second device."

Signed and Sealed this
Nineteenth Day of March, 2024

Katherine Kelly Vidal
*Director of the United States Patent and Trademark Office*